(12) United States Patent
Katsuta

(10) Patent No.: US 11,298,878 B2
(45) Date of Patent: Apr. 12, 2022

(54) MANUFACTURING APPARATUS

(71) Applicant: FUJIFILM Business Innovation Corp., Tokyo (JP)

(72) Inventor: Nobuhiro Katsuta, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 86 days.

(21) Appl. No.: 16/840,459

(22) Filed: Apr. 6, 2020

(65) Prior Publication Data

US 2021/0197467 A1 Jul. 1, 2021

(30) Foreign Application Priority Data

Dec. 26, 2019 (JP) .............................. JP2019-237409

(51) Int. Cl.
| | | |
|---|---|---|
| *B29C 64/295* | (2017.01) | |
| *B29C 64/205* | (2017.01) | |
| *B29C 64/188* | (2017.01) | |
| *B33Y 30/00* | (2015.01) | |

(52) U.S. Cl.
CPC .......... *B29C 64/295* (2017.08); *B29C 64/188* (2017.08); *B29C 64/205* (2017.08); *B33Y 30/00* (2014.12)

(58) Field of Classification Search
CPC ... B29C 64/295; B29C 64/205; B29C 64/188; B29C 64/118; B29C 43/52; B29C 43/18; B29C 33/02; B29C 70/384; B29C 70/382; B29C 70/30

See application file for complete search history.

(56) References Cited

U.S. PATENT DOCUMENTS

| | | | |
|---|---|---|---|
| 2009/0035405 A1* | 2/2009 | Leavitt .................... | B29C 48/08 425/97 |
| 2014/0210137 A1* | 7/2014 | Patterson .............. | B29C 64/118 264/401 |
| 2014/0291886 A1 | 10/2014 | Mark et al. | |
| 2016/0257068 A1* | 9/2016 | Albert .................... | B29C 64/255 |
| 2017/0028644 A1* | 2/2017 | Evans .................... | B29C 64/393 |
| 2017/0274585 A1 | 9/2017 | Armijo et al. | |
| 2018/0133980 A1* | 5/2018 | Mantell .................. | B29C 48/05 |

FOREIGN PATENT DOCUMENTS

JP 2016531020 10/2016

* cited by examiner

*Primary Examiner* — Joseph S Del Sole
*Assistant Examiner* — Mohamed K Ahmed Ali
(74) *Attorney, Agent, or Firm* — JCIPRNET

(57) ABSTRACT

A manufacturing apparatus includes a delivery unit and individual heating units. The delivery unit delivers plural linear manufacturing materials that are arranged side by side to apply the manufacturing materials onto a table. The manufacturing materials contain resin. The individual heating units individually heat the manufacturing materials delivered by the delivery unit.

15 Claims, 17 Drawing Sheets

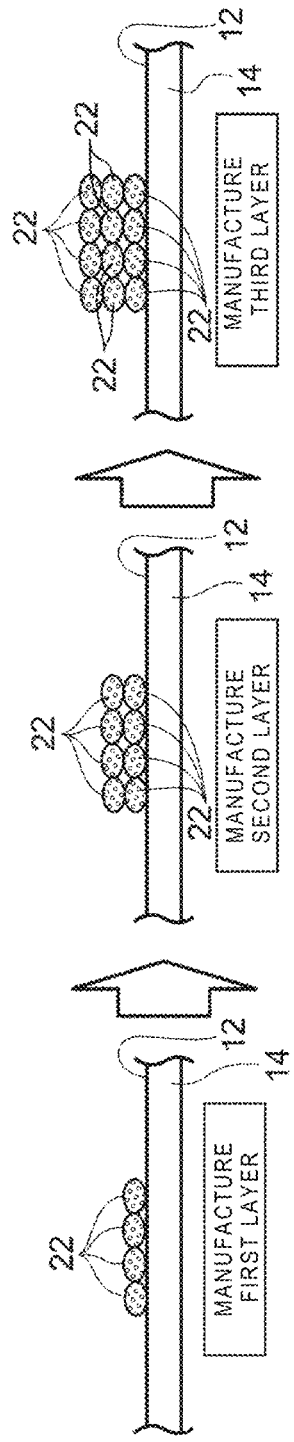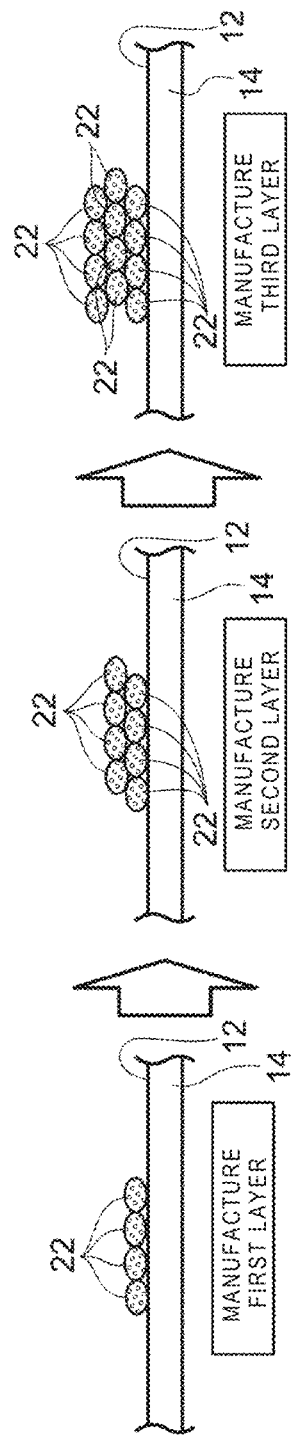

FIG. 21

| PRESSING FORCE (kg/cm²) | BENDING STRENGTH | INTER-LAYER ADHESION |
|---|---|---|
| 0.5 | △ | × |
| 1.0 | △ | △ |
| 1.5 | ○ | ○ |
| 2.0 | ○ | ○ |
| 2.5 | ○ | ○ |
| 3.0 | ○ | ○ |
| 3.5 | ○ | ○ |
| 4.0 | ○ | ○ |
| 4.5 | ○ | ○ |
| 5.0 | ○ | ○ |

FIG. 22

| RESIN MATERIAL | MELTING TEMPERATURE (°C) | MANUFACTURING TEMPERATURE (°C) |
|---|---|---|
| PP | 160~170 | ≧170°C |
| PA6 | 220~240 | ≧240°C |
| PA66 | 260~280 | ≧280°C |
| PA12 | 170~190 | ≧190°C |
| ABS | 90~110 | ≧110°C |
| PEAK | 300~350 | ≧350°C |

MANUFACTURING APPARATUS

This application is based on and claims priority under 35 USC 119 from Japanese Patent Application No. 2019-237409 filed Dec. 26, 2019.

BACKGROUND

1. Technical Field

The present disclosure relates to a manufacturing apparatus that delivers a manufacturing material.

2. Related Art

Examples of a manufacturing apparatus includes a 3D printer as disclosed in JP-T-2016-531020.

In the 3D printer, a void-free reinforced filament is fed to a conduit nozzle. The reinforced filament includes a continuous or semi-continuous core and a matrix material surrounding the core. The reinforced filament is heated to a temperature higher than the melting temperature of the matrix material and lower than the melting temperature of the core before the filament is applied from the conduit nozzle.

US-A-2017-0274585 discloses a manufacturing apparatus using a filament.

The manufacturing apparatus deposits a first composite filament on a build surface. The softened first composite filament retains an ability to be shaped. Then, the first composite filament is flattened.

SUMMARY

Aspects of non-limiting embodiments of the present disclosure relate to providing a manufacturing apparatus capable of improving adhesion between manufacturing materials as compared with a case in which plural manufacturing materials are collectively heated.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a manufacturing apparatus including a delivery unit and individual heating units. The delivery unit delivers plural linear manufacturing materials that are arranged side by side to apply the manufacturing materials onto a table. The manufacturing materials contain resin. The individual heating units individually heat the manufacturing materials delivered by the delivery unit.

BRIEF DESCRIPTION OF THE DRAWINGS

Exemplary embodiment(s) of the present disclosure will be described in detail based on the following figures, wherein:

FIG. 9 is a diagram illustrating a procedure of applying manufacturing materials in the manufacturing apparatus according to the first exemplary embodiment;

FIG. 10 is a diagram illustrating another procedure of applying the manufacturing materials in the manufacturing apparatus according to the first exemplary embodiment;

FIG. 21 is a diagram illustrating experimental results; and

FIG. 22 is a diagram illustrating a manufacturing condition for each resin type.

DETAILED DESCRIPTION

First Exemplary Embodiment

Figure 1:
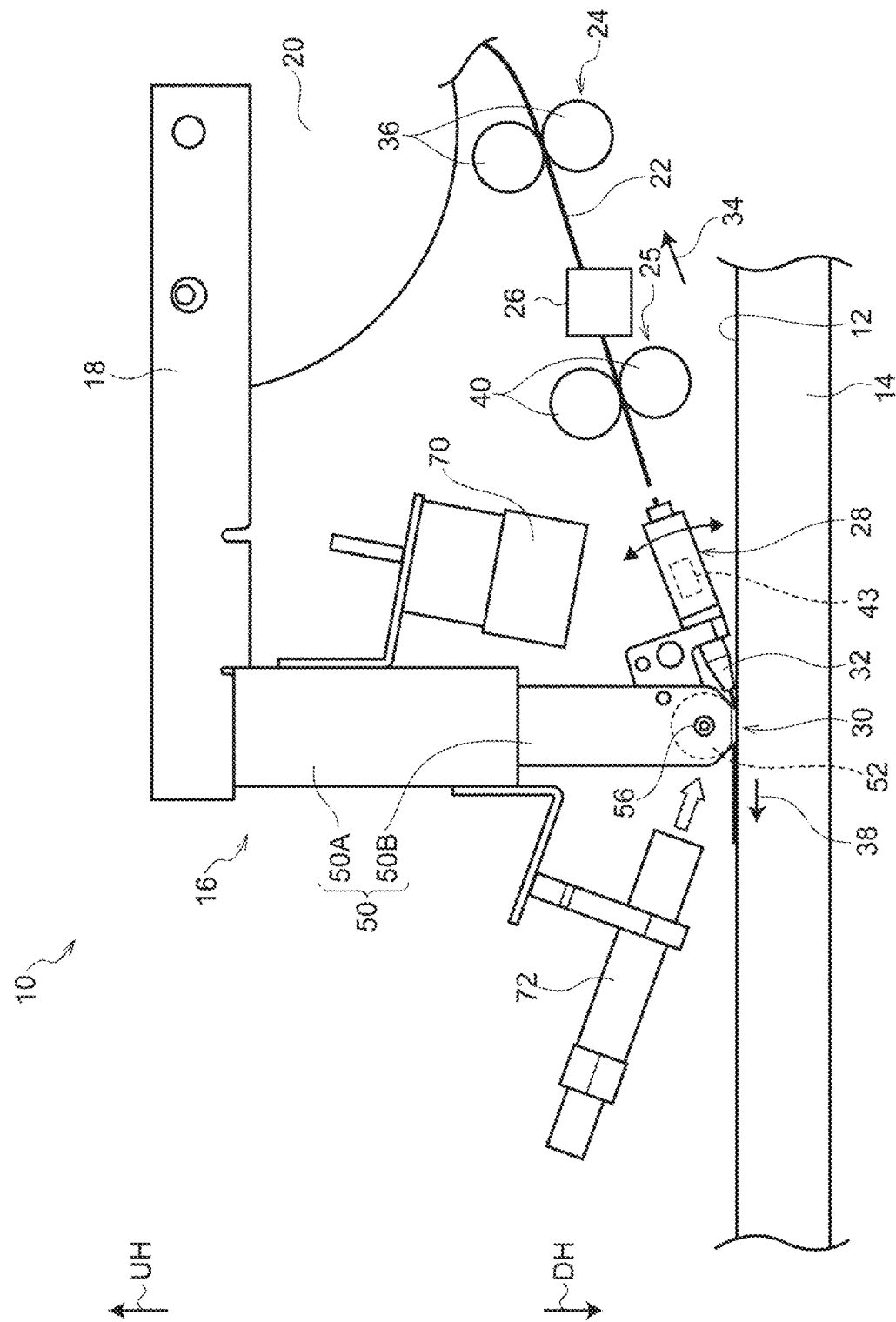
FIG. 1 is a side view illustrating a part of a manufacturing apparatus according to a first exemplary embodiment.

An example of a manufacturing apparatus 10 according to the first exemplary embodiment will be described with reference to the drawings. An upward direction will be denoted by the sign "UH" and a downward direction will be denoted by the sign "DH" in the drawings.

FIG. 1 is a diagram illustrating the manufacturing apparatus 10 according to the present exemplary embodiment. The manufacturing apparatus 10 manufactures a three-dimensional object based on shape data.

The manufacturing apparatus 10 includes a table 14 having a manufacturing surface 12 on which the three-dimensional object is to be manufactured, and a supply device 16 that supplies manufacturing materials to the table 14.

The supply device 16 includes four reels 20 (it is noted that only one reel is illustrated in FIG. 1) that are rotatably supported by a frame 18, and upstream transport units 24 that respectively transport linear manufacturing materials 22 delivered from each reel 20. The supply device 16 includes cutting units 26 that respectively cut the manufacturing materials 22 transported by the upstream transport units 24, and downstream transport units 25 that respectively transport the manufacturing materials 22 from the cutting units 26.

The supply device 16 further includes a delivery unit 28 that delivers the manufacturing materials 22 side by side from the downstream transport units 25. The delivery unit 28 is configured to change an angle between the delivery unit 28 and the manufacturing surface 12 of the table 14.

Figure 2:
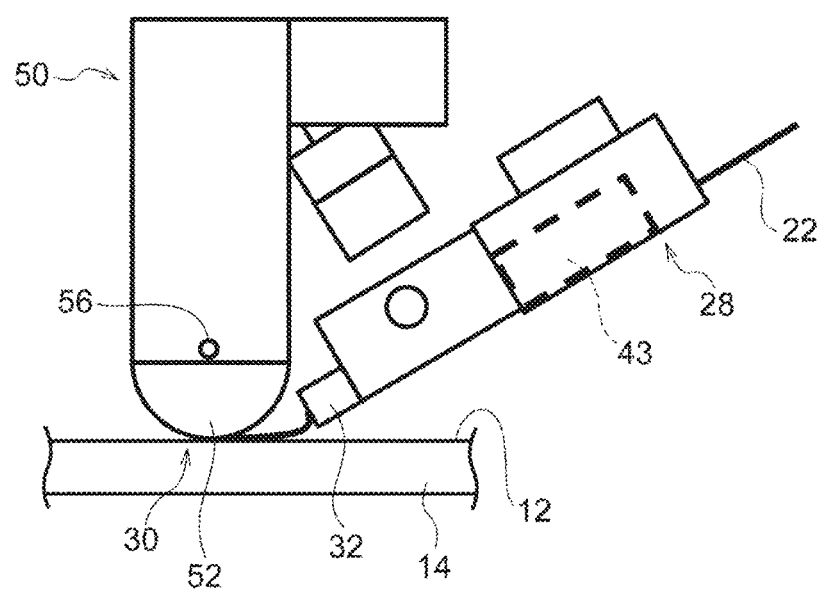
FIG. 2 is an enlarged view illustrating a part of the manufacturing apparatus according to the first exemplary embodiment.
Figure 3:
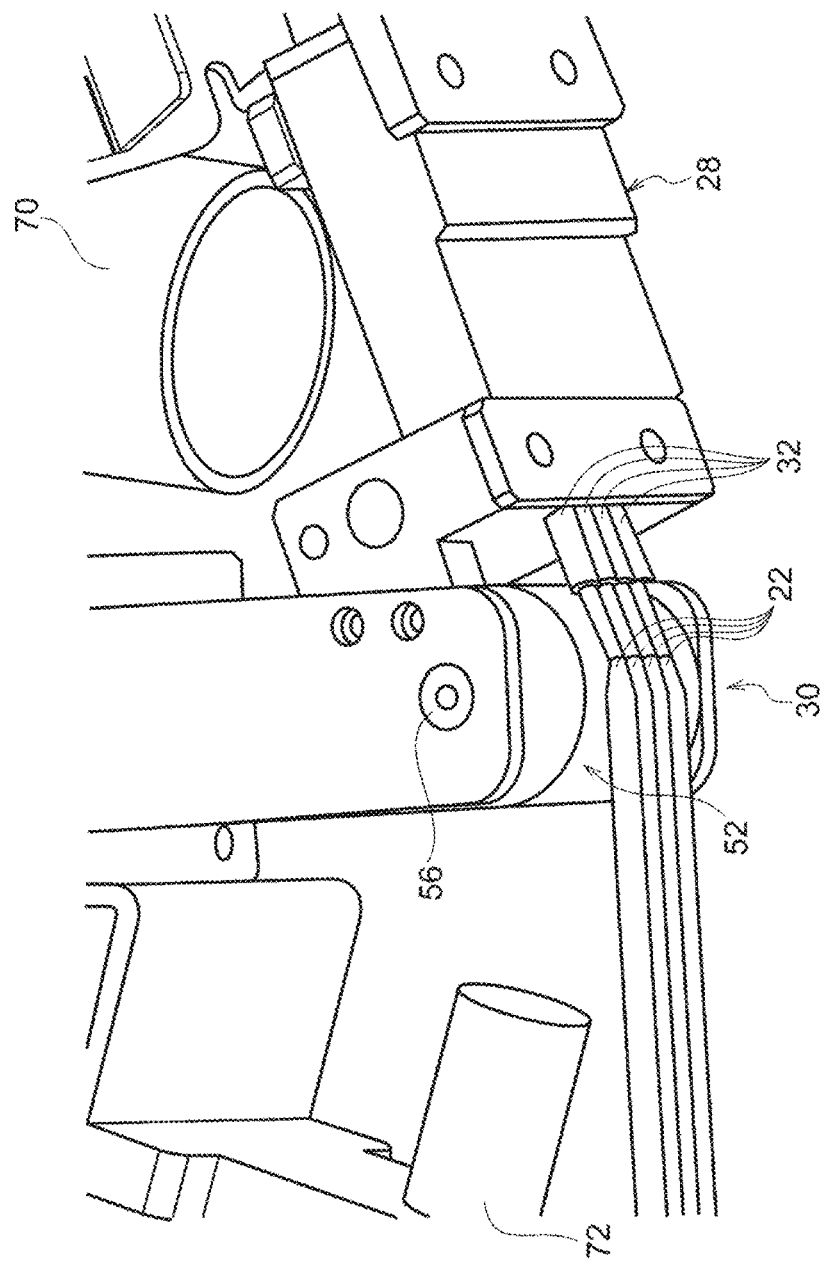
FIG. 3 is a perspective view illustrating a part of the manufacturing apparatus according to the first exemplary embodiment as viewed from below.

As illustrated in FIGS. 2 and 3, the delivery unit 28 includes individual heating units 32 that individually heat the manufacturing materials 22 passing through the individual heating units 32. The supply device 16 includes a shape adjustment unit 30 that adjusts shapes of the manufacturing materials 22 by pressing the manufacturing materials 22 delivered from the delivery unit 28 against a target object.

Table

The table 14 is supported by, for example, a drive table (not illustrated). The drive table drives the table 14 in X-Y directions along a horizontal surface, in height directions (in the upward direction UH and the downward direction DH), and in a rotation direction based on the shape data of the three-dimensional object. With this configuration, the three-dimensional object is manufactured on the manufacturing surface 12 with the manufacturing materials 22 delivered from the supply device 16 to the table 14.

The present exemplary embodiment will describe a case in which the three-dimensional object is manufactured by driving the table 14 based on the shape data. It is noted that the present disclosure is not limited to this case. For example, the supply device 16 may be driven by a manipulator based on the shape data to manufacture the three-dimensional object.

Reel

The manufacturing material 22 by held in the reel 20 with the manufacturing material 22 being wound on the reel 20. The wound manufacturing material 22 can be drawn out.

Manufacturing Material

Figure 4:
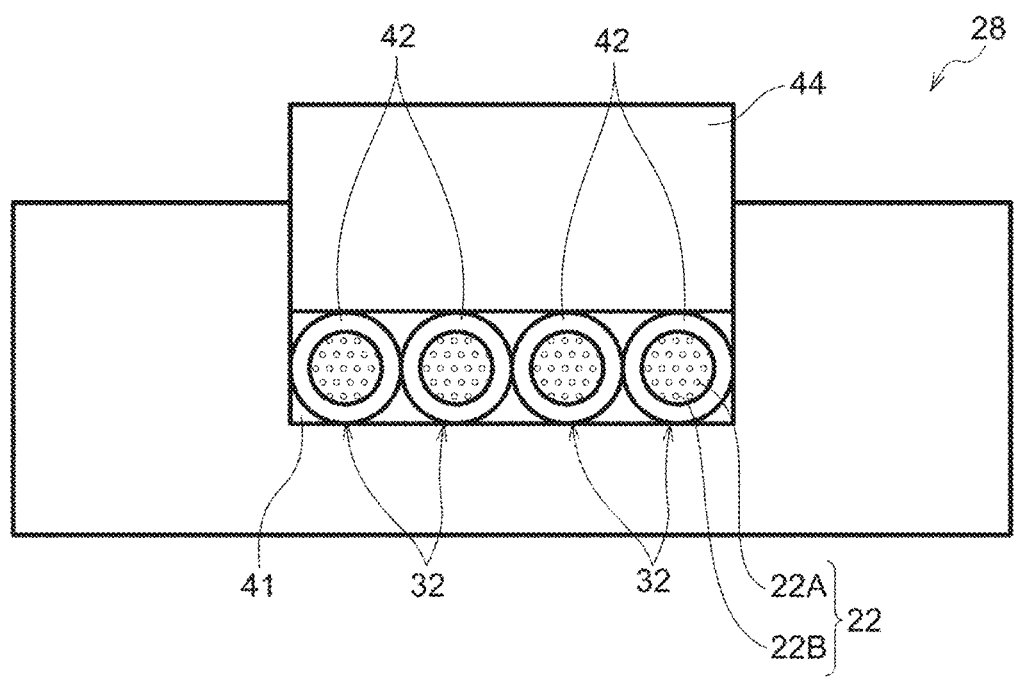
FIG. 4 is a front view illustrating a delivery unit of the manufacturing apparatus according to the first exemplary embodiment as viewed from a downstream position in a moving direction of manufacturing materials.

As illustrated in FIG. 4, the manufacturing material 22 includes plural continuous fibers 22A and a resin 22B with which the continuous fibers 22A are impregnated. Examples of the continuous fibers 22A includes a carbon fiber. The resin 22B with which the manufacturing material 22 is impregnated is made of thermoplastic resin. Accordingly, the manufacturing material 22 can be softened and deformed when heated, and maintains its shape after cured at room temperature.

Transport Unit

As illustrated in FIG. 1, the upstream transport unit 24 includes a pair of upstream rollers 36 provided upstream 34 of the cutting unit 26 in a moving direction of the manufacturing material 22. The downstream transport unit 25 includes a pair of downstream rollers 40 provided downstream 38 of the cutting unit 26 in the moving direction of the manufacturing material 22.

The manufacturing material 22 is sandwiched between the upstream rollers 36. When the upstream rollers 36 are driven by a driving device (not illustrated) to rotate, the manufacturing material 22 from the reel 20 is delivered to the cutting unit 26. The manufacturing material 22 delivered from the cutting unit 26 is sandwiched between the downstream rollers 40. When the downstream rollers 40 are driven by a driving device (not illustrated) to rotate, the manufacturing material 22 from the cutting unit 26 is delivered to the delivery unit 28.

The driving device that rotatably drives each of the rollers 36 and 40 controls rotation speed of each of the rollers 36 and 40 according to a drive signal from a control device (not illustrated).

Cutting Unit

Upon receipt of a cutting signal from the control device (not illustrated), each cutting unit 26 cuts the corresponding manufacturing material 22 between the upstream transport unit 24 and the downstream transport unit 25. Accordingly, the manufacturing material 22 is cut to a length required in manufacturing.

The downstream transport unit 25 delivers the cut manufacturing material 22 to the delivery unit 28. Accordingly, the three-dimensional object is manufactured using the cut manufacturing material 22 to a specified length.

The present exemplary embodiment will describe an example in which the supply device 16 includes the cutting unit 26. It is noted that the present disclosure is not limited to this configuration. The supply device 16 may not include the cutting unit 26.

Delivery Unit

As illustrated in FIGS. 2 and 3, the delivery unit 28 is formed into a rectangular block shape. As illustrated in FIG. 4, the delivery unit 28 includes a rectangular recess portion 41 extending in a length direction. Four individual heating units 32 are provided in the rectangular recess portion 41. The delivery unit 28 applies the four manufacturing materials 22 onto the manufacturing surface 12 of the table 14 such that the four manufacturing materials 22 are arranged side by side and adjacent to each other. The manufacturing surface 12 of the table 14 is an example of the target object.

Here, examples of the target object include a manufacturing material 22 that has been applied onto the table 14 as well as the manufacturing surface 12 of the table 14.

Individual Heating Unit

Each individual heating unit 32 includes a cylindrical body 42 through which a corresponding one of the manufacturing materials 22 passes while being applied. In other words, each individual heating unit 32 includes the cylindrical body 42 that allows the corresponding one of the manufacturing materials 22 to pass therethrough. An inner diameter of the cylindrical body 42 corresponds to an outer dimension of the used manufacturing material 22. The inner diameter of the cylindrical body 42 is, for example, 0.5 mm or more and 0.6 mm or less.

A material of the cylindrical body 42 may be iron, SUS, or copper, but is not particularly limited to these materials. The material of the cylindrical body 42 may be any material having good heat conduction properties. The four cylindrical bodies 42 are employed in the present exemplary embodiment. It is noted that the number of the cylindrical bodies 26 is not limited to four.

The present exemplary embodiment will describe a case in which the individual heating units 32 include the cylindrical bodies 42 that allow the manufacturing materials 22 having a circular cross section to pass therethrough. It is noted that a shape of the cylindrical bodies 42 is not limited to this case. For example, the individual heating units 32 may include rectangular tubular bodies.

The cylindrical bodies 42 are arranged side by side along a bottom surface in the rectangular recess portion 41. A block 44 is inserted into the rectangular recess portion 41 so as to prevent the cylindrical bodies 42 from being detached.

As illustrated in FIGS. 1 and 2, four heating units 43 are provided at outer peripheral portions of the cylindrical bodies 42 that constitute the individual heating units 32. The four heating units 43 individually heat the cylindrical bodies 42. Each heating unit 43 is implemented by a heater including, for example, an electric heating wire.

Each heater heats the corresponding cylindrical body 42 so as to reach a target temperature indicated by a temperature signal from the control device, so that the manufacturing material 22 that passes through each cylindrical body 42 is heated to the target temperature from the outer peripheral portion thereof. Accordingly, heating temperatures can be set for the individual heating units 32 individually.

Figure 5:
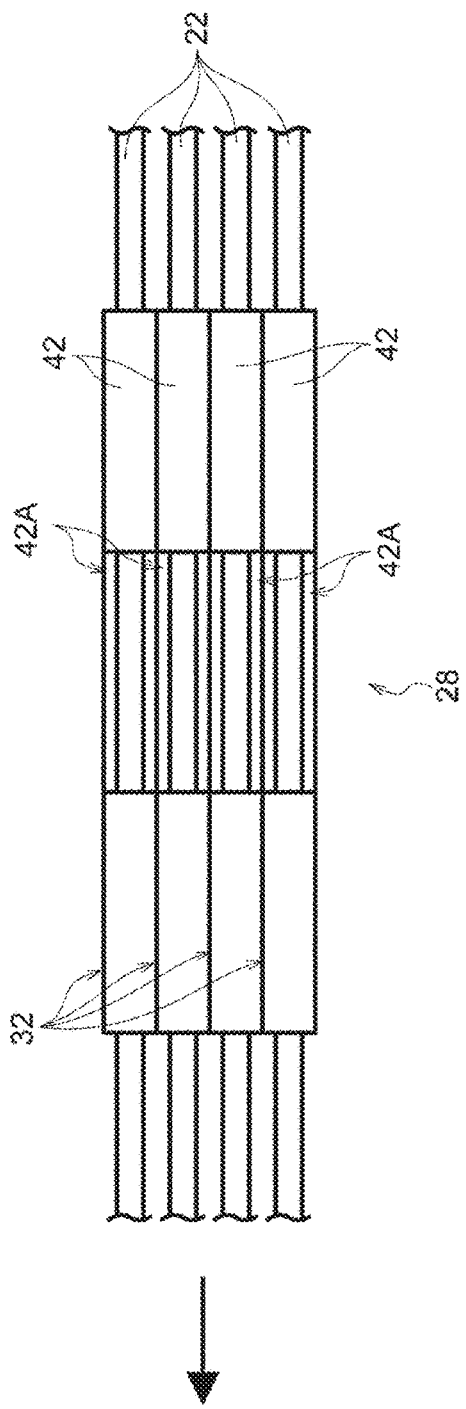
FIG. 5 is a plan view illustrating individual heating units of the manufacturing apparatus according to the first exemplary embodiment.
Figure 6:
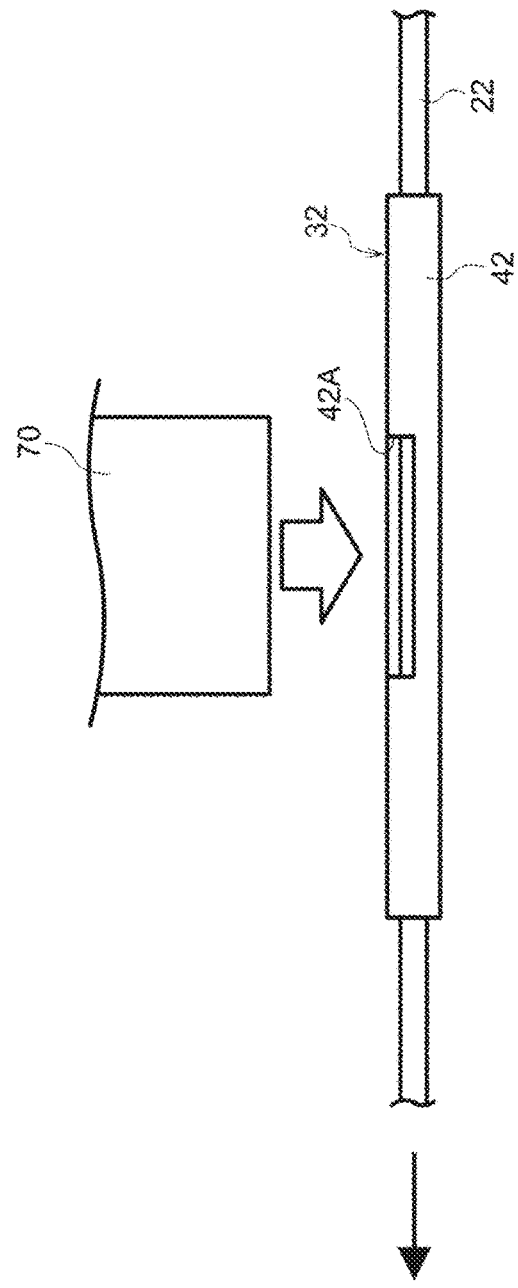
FIG. 6 is a diagram illustrating a relationship between the individual heating units and an upstream heating unit of the manufacturing apparatus according to the first exemplary embodiment as viewed from a side surface.

As illustrated in FIGS. 5 and 6, an opening 42A is formed on a side surface of the cylindrical body 42 at an opening side of the rectangular recess portion 41. The manufacturing material 22 passing through the cylindrical body 42 is exposed through the opening 42A.

Upstream Heating Unit

As illustrated in FIG. 1, the supply device 16 includes an upstream heating unit 70 above the delivery unit 28. The upstream heating unit 70 is a device that blows hot air towards the rectangular recess portion 41 of the delivery unit 28. The upstream heating unit 70 blows the hot air to the manufacturing materials 22 in the respective cylindrical bodies 42 through the openings 42A of the cylindrical bodies 42 in the rectangular recess portion 41, so as to heat the manufacturing materials 22 overall and aggregate the manufacturing materials 22.

The upstream heating unit 70 may be a device that heats the manufacturing materials 22 with radiant heat.

Shape Adjustment Unit

As illustrated in FIG. 1, the shape adjustment unit 30 includes an extending unit 50 extending downwards from the frame 18, and a pressing unit 52 replaceably attached to a lower end portion of the extending unit 50. The extending unit 50 includes an extending unit body 50A fixed to the frame 18, and an operation shaft SOB extending from the extending unit body 50A. The extending unit body 50A adjusts an extension amount of the operation shaft 50B based on an operation signal from the control device (not illustrated).

Figure 7:
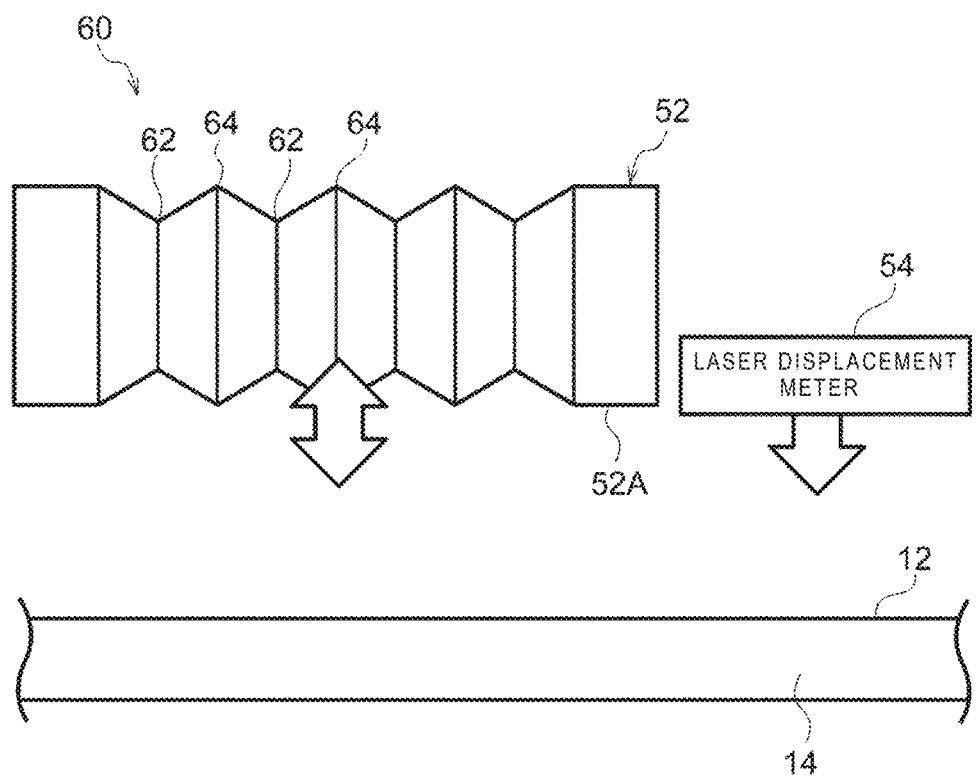
FIG. 7 is a diagram illustrating an example of a configuration for adjusting a height of a pressing unit of the manufacturing apparatus according to the first exemplary embodiment.

As illustrated in FIG. 7, for example, a laser displacement meter 54 is provided at a tip end of the extending unit 50. The laser displacement meter 54 measures a distance from a lower portion of an outer peripheral surface 52A of the pressing unit 52 to the target object. The control device adjusts the extension amount of the operation shaft SOB such that the distance measured by the laser displacement meter 54 becomes a target distance. The shape adjustment unit 30 adjusts and controls a shape of the manufacturing material 22 in a thickness direction by pressing the pressing unit 52 against the manufacturing material 22.

Here, in place of the method described above, the following method may be used as a method for setting the distance from the outer peripheral surface 52A of the pressing unit 52 to, for example, the manufacturing surface 12 of the table 14. That is, the method calculates the distance based on the extension amount of the operation shaft 50B, using an initial value when the pressing unit 52 is pressed against the manufacturing surface 12 as a reference.

Pressing Unit

Figure 8:
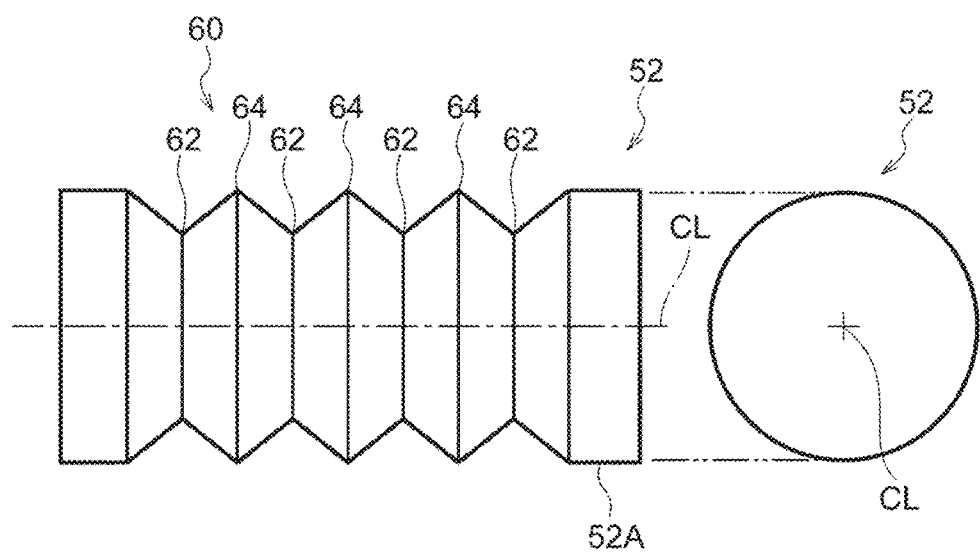
FIG. 8 is a diagram illustrating the pressing unit of the manufacturing apparatus according to the first exemplary embodiment.

As illustrated in FIG. 8, the pressing unit 52 is formed in a columnar shape. As illustrated in FIG. 1, the pressing unit 52 is rotatably supported by the operation shaft 50B via a shaft portion 56 that passes through a center CL. An extending direction of the shaft portion 56 is a direction intersecting the moving direction of the manufacturing materials 22. The pressing unit 52 rotates with the outer peripheral surface 52A being in contact with the manufacturing material 22 that is supplied and applied onto the table 14, so as to move in a length direction of the manufacturing material 22.

The outer peripheral surface 52A of the pressing unit 52 is formed with an irregularity portion 60 that presses the manufacturing materials 22 delivered from the delivery unit 28 against the target object. It is noted that the irregularity portion 60 is exaggerated in the drawings.

Examples of the target object against which the irregularity portion 60 of the pressing unit 52 presses the manufacturing material 22 include the manufacturing surface 12 of the table 14 and a pressed manufacturing material formed from the manufacturing materials 22 applied on the manufacturing surface 12. Accordingly, the pressing unit 52 presses, towards the table 14, the manufacturing materials 22 supplied from the individual heating unit 32 onto the table 14.

The irregularity portion 60 includes four recess portions 62 arranged in a length direction of the pressing unit 52. Each recess portion 62 is formed into a V shape and extends in a circumferential direction.

The recess portions 62 are arranged in the length direction such that the recess portion 62 and a protruding portion 64 having a triangle cross section are alternately formed on the outer peripheral surface 52A of the pressing unit 52. The recess portions 62 and the protruding portions 64 constitute irregularities on the pressing unit 52.

The pressing unit 52 presses, against the target object, the plural manufacturing materials 22 that are arranged side by side and joins the adjacent manufacturing materials 22 together, so as to form the pressed manufacturing material in which the plural manufacturing materials 22 are joined together and form irregularities on a surface of the pressed manufacturing material.

Here, the control device changes a press force from the pressing unit 52 and controls an aspect ratio indicating a ratio of a width of the pressed manufacturing material to a thickness of the pressed manufacturing material by adjusting an extension amount of the operation shaft 50B such that the distance measured by the laser displacement meter 54 (see FIG. 7) becomes the target distance.

Downstream Heating Unit

The supply device 16 includes a downstream heating unit 72 that heats the pressing unit 52.

The downstream heating unit 72 is a device that blows hot air towards the pressing unit 52. The downstream heating unit 72 heats the pressing unit 52 so as to heat the manufacturing materials 22 pressed by the pressing unit 52.

The downstream heating unit 72 may be a device that heats the pressing unit 52 with radiant heat.

FIG. 9 is a diagram illustrating a procedure of applying the manufacturing materials 22 in the manufacturing apparatus 10. First, the manufacturing materials 22 are applied onto the manufacturing surface 12 of the table 14 so as to form a first layer. Next, the manufacturing materials 22 are applied to be staked on the manufacturing materials 22 of the first layer, so that a second layer is formed. Then, the manufacturing materials 22 are applied so as to be staked on the manufacturing materials 22 of the second layer, so that a third layer is formed.

In this manner, the manufacturing materials 22 of an upper layer are stacked on the manufacturing materials 22 of a lower layer, so that the three-dimensional object is manufactured.

FIG. 10 is a diagram illustrating a procedure of applying the manufacturing materials 22 using a different method. First, the manufacturing materials 22 are applied onto the manufacturing surface 12 of the table 14 so as to form a first layer. Next, the manufacturing materials 22 are applied to be arranged between the manufacturing materials 22 of the first layer (that is, at positions shifted by a half pitch in a width direction), so that a second layer is formed. Then, the manufacturing materials 22 are applied to be arranged between the manufacturing materials 22 of the second layer (that is, at positions shifted by a half pitch in the width direction), so that a third layer is formed.

In the present exemplary embodiment, the manufacturing materials 22 of a lower layer are shifted in the width direction by the half pitch from the manufacturing materials 22 of an upper layer. It is noted that the present disclosure is not limited to this example. For example, the manufacturing materials 22 of a lower layer may be shifted by ¼ pitch in the width direction from the manufacturing materials 22 of an upper layer.

In this manner, since the manufacturing materials 22 of an upper layer are stacked to be arranged between the manufacturing materials 22 of a lower layer, a density of the manufacturing materials 22 can be increased.

Figure 11:
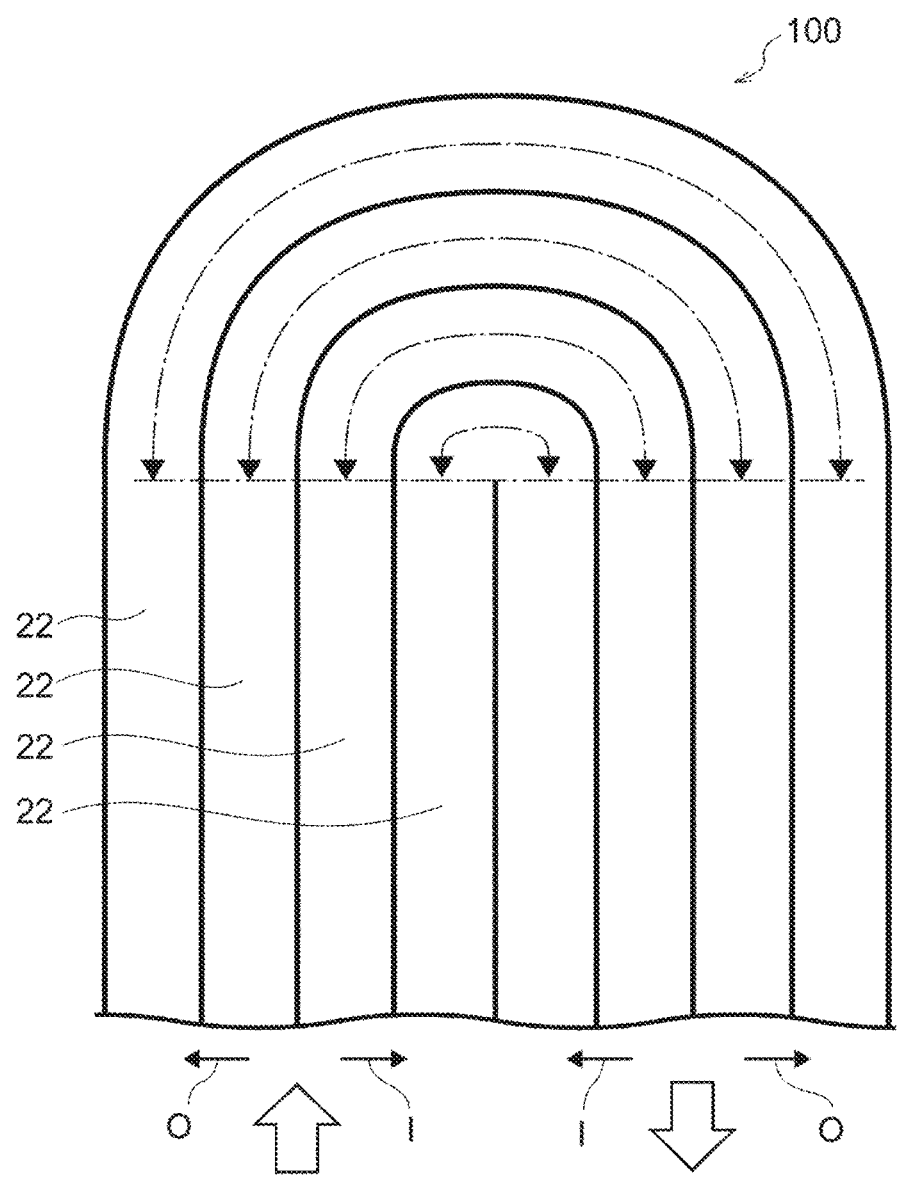
FIG. 11 is a diagram illustrating a state of changing an applying direction of the manufacturing materials applied in the manufacturing apparatus according to the first exemplary embodiment.

FIG. 11 is a diagram illustrating a state of changing an applying direction of the manufacturing materials 22 applied in the manufacturing apparatus 10.

When an applying direction of the manufacturing materials 22 heated by the individual heating units 32 is changed to form a corner portion 100, the delivery unit 28 increases a delivery amount of the manufacturing material 22 provided at an outer side O to be larger than a delivery amount of the manufacturing material 22 provided at an inner side I.

Specifically, when the corner portion 100 is formed, a transport speed at which the upstream transport unit 24 and the downstream transport unit 25 transport the manufacturing material 22 provided at the outer side O is larger than that at which the upstream transport unit 24 and the downstream transport unit 25 transport the manufacturing material 22 provided at the inner side I.

When the applying direction is changed, a heating temperature of the individual heating unit 32 that heats the manufacturing materials 22 provided at the outer side O is higher than a heating temperature of the individual heating unit 32 that heats the manufacturing materials 22 provided at the inner side I.

Accordingly, the heating temperatures of the individual heating units 32 are changed in accordance with the delivery amounts of the manufacturing materials 22 delivered from the delivery unit 28.

Block Diagram

Figure 12:
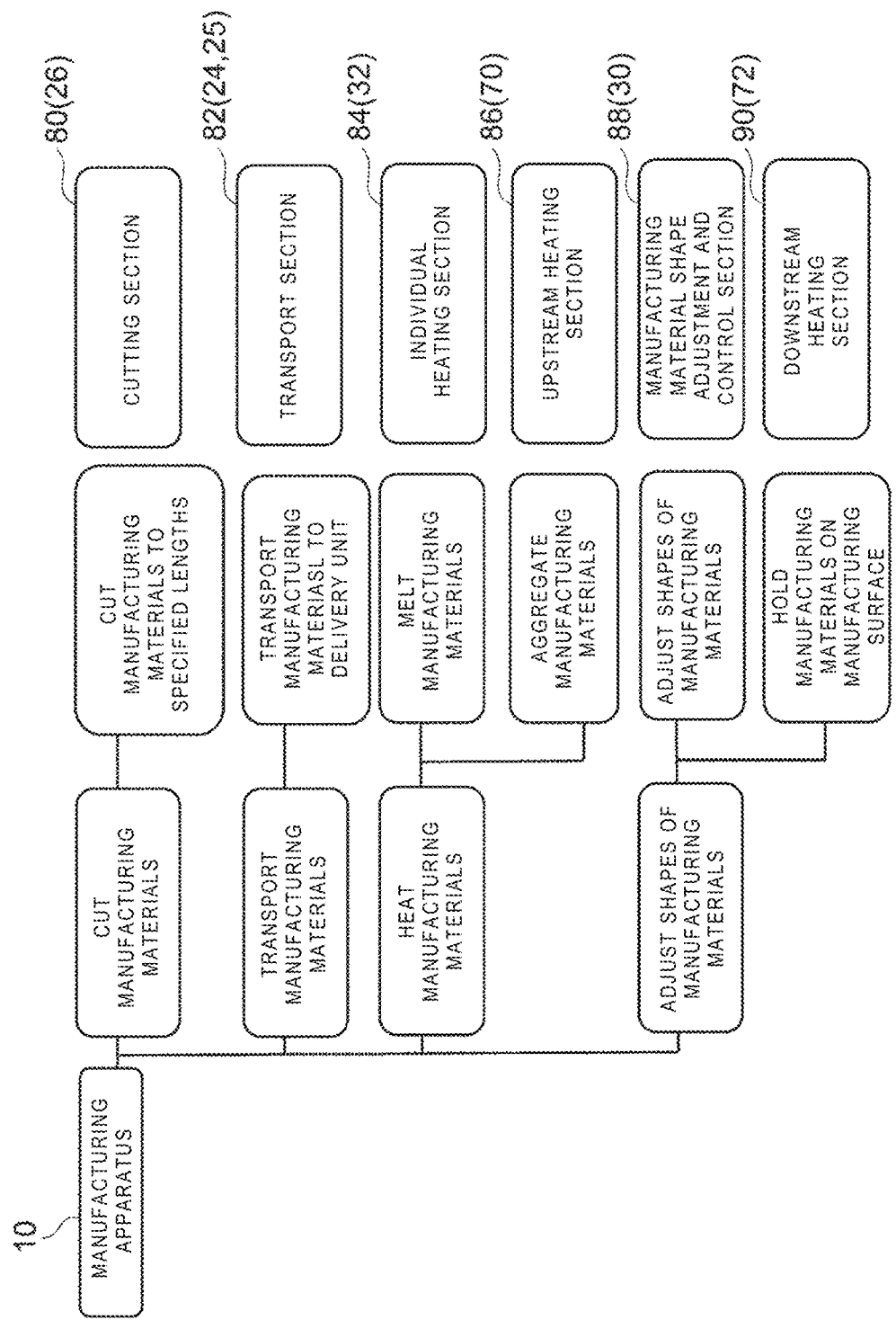
FIG. 12 is a block diagram illustrating functions and a configuration of the manufacturing apparatus according to the first exemplary embodiment.

FIG. 12 is a block diagram illustrating functions and a configuration of the manufacturing apparatus 10.

The cutting units 26 are provided in a cutting section 80 that cuts the manufacturing materials 22. The cutting units 26 cut the manufacturing materials 22 passing through the cutting units 26 to a specified length based on the cutting signals from the control device. The transport units 24 and 25 are provided in a transport section 82 that transports the manufacturing materials 22. The transport units 24 and 25 transport the manufacturing materials 22 to the delivery unit 28.

The individual heating units 32 are provided in an individual heating section 84 that heats the manufacturing materials 22. The individual heating units 32 heat and melt the manufacturing materials 22. The upstream heating unit 70 is provided in an upstream heating section 86 that heats manufacturing materials 22 overall. The upstream heating unit 70 aggregates the manufacturing materials 22.

The shape adjustment unit 30 provided in a manufacturing material shape adjustment and control section 88 adjusts a shape of the manufacturing materials 22. The downstream heating unit 72 is provided in a downstream heating section 90 that heats the manufacturing materials 22. The downstream heating unit 72 causes the manufacturing surface 12 to hold the manufacturing materials 22.

Effects

Effects of the present exemplary embodiment having the above configurations will be described.

The manufacturing apparatus 10 according to the present exemplary embodiment includes the individual heating units 32 that individually heat the manufacturing materials 22 delivered from the delivery unit 28.

Therefore, adhesion between the manufacturing materials 22 can be improved as compared with a case in which the plural manufacturing materials 22 are collectively heated.

Since the manufacturing materials 22 are individually heated, a temperature difference between the manufacturing materials 22 is small and manufacturing accuracy can be improved as compared with the case in which the manufacturing materials 22 are collectively heated.

When cross sections of the manufacturing materials 22 are increased or the number of the manufacturing materials 22 is increased, insufficient heating of the manufacturing materials 22 may disturb a three-dimensional object or break down the manufacturing materials 22 during curve manufacturing, so that desired three-dimensional object may not be obtained. However, the present exemplary embodiment can prevent these phenomena.

The heating temperatures can be set for the individual heating units 32 individually.

Therefore, a temperature can be changed for each manufacturing material 22 as compared with a case in which heating temperatures of the individual heating units 32 are the same.

When an applying direction of the manufacturing materials 22 heated by the individual heating units 32 is changed, a heating temperature of the individual heating unit 32 that heats the manufacturing material 22 provided at the outer side O is higher than a heating temperature of the individual heating unit 32 that heats the manufacturing material 22 provided at the inner side I.

Therefore, the manufacturing material 22 provided at the outer side O is prompted to be elongated as compared with a case in which heating temperatures at which the manufacturing materials 22 are heated are the same.

When the applying direction of the manufacturing materials 22 heated by the individual heating units 32 is changed, the delivery unit 28 increases a delivery amount of the manufacturing material 22 provided at the outer side O to be larger than a delivery amount of the manufacturing material 22 provided at the inner side I.

Therefore, elongation percentages of the manufacturing materials 22 provided at the outer side O can be decreased as compared with a case in which a delivery amount of the manufacturing material 22 at the inner side I and a delivery amount of the manufacturing material 22 at the outer side O are the same.

When the applying direction is changed, a heating temperature of the individual heating unit 32 that heats a manufacturing material 22 provided at the outer side O is higher than a heating temperature of the individual heating unit 32 that heats a manufacturing material 22 provided at the inner side I.

Therefore, insufficient heating can be prevented from occurring along with an increase of the delivery amounts as compared with a case in which heating temperatures at which the manufacturing materials 22 are heated are the same.

Accordingly, heating temperatures of the individual heating units 32 are changed in accordance with delivery amounts of the manufacturing materials 22 delivered from the delivery unit 28.

Therefore, insufficient heating can be prevented from occurring along with an increase in the delivery amount as compared with a case in which heating temperatures are set irrespective of the delivery amounts.

Each individual heating unit 32 has a tubular shape that allows the manufacturing material 22 to pass therethrough.

Therefore, heating spots on a peripheral surface can be prevented as compared with a case in which the manufacturing material 22 is heated from one side surface.

The pressing unit 52 is provided which presses, towards the table 14, the manufacturing materials 22 supplied from the individual heating units 32 onto the table 14.

Therefore, adhesion between the manufacturing materials 22 can be improved as compared with a case in which no pressing unit 52 is provided.

The downstream heating unit 72 is provided which heats the pressing unit 52.

Therefore, adhesion between the manufacturing materials 22 that are pressed can be improved as compared with a case in which the manufacturing materials 22 are heated only upstream of the pressing unit 52.

A temperature during pressing of the manufacturing materials 22 can be increased by increasing a temperature of the pressing unit 52, and the above-described effects can be obtained.

The upstream heating unit 70 is provided upstream 34 of the pressing unit 52 in the moving direction of manufacturing materials 22. The upstream heat unit 70 heats the plural manufacturing materials 22 simultaneously.

Therefore, an overall temperature of the manufacturing materials 22 can be increased as compared with a case in which the manufacturing materials 22 are heated only downstream of the pressing unit 52. Accordingly, a load on the individual heating units 32 can be decreased.

The present exemplary embodiment describes the example in which the opening 42A is formed in each of the cylindrical bodies 42 that constitute the individual heating units 32. It is noted that the present disclosure is not limited to this example but may have the following configuration.

Second Exemplary Embodiment

Figure 13:
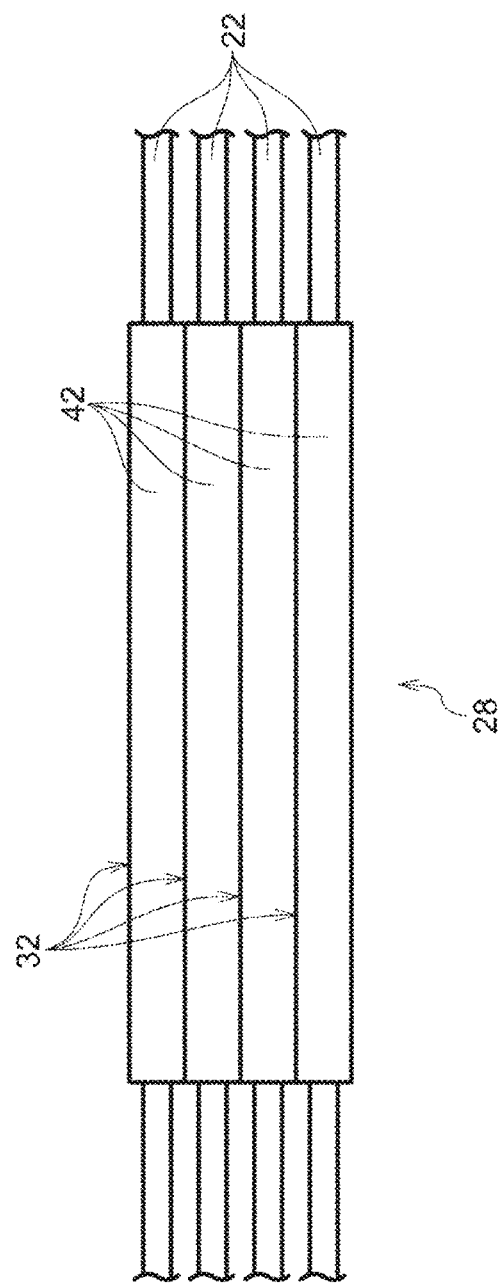
FIG. 13 is a plan view illustrating individual heating units of a manufacturing apparatus according to a second exemplary embodiment.

FIG. 13 is a diagram illustrating the cylindrical bodies 42 used in the individual heating units 32 of the manufacturing apparatus 10 according to the second exemplary embodiment. No opening is formed on the peripheral surfaces of each of the cylindrical bodies 42.

Even in such a case, the second exemplary embodiment provides the same effect as the first exemplary embodiment provides except for effects relating to the cylindrical bodies 42 having no opening 42A.

Third Exemplary Embodiment

Figure 14:
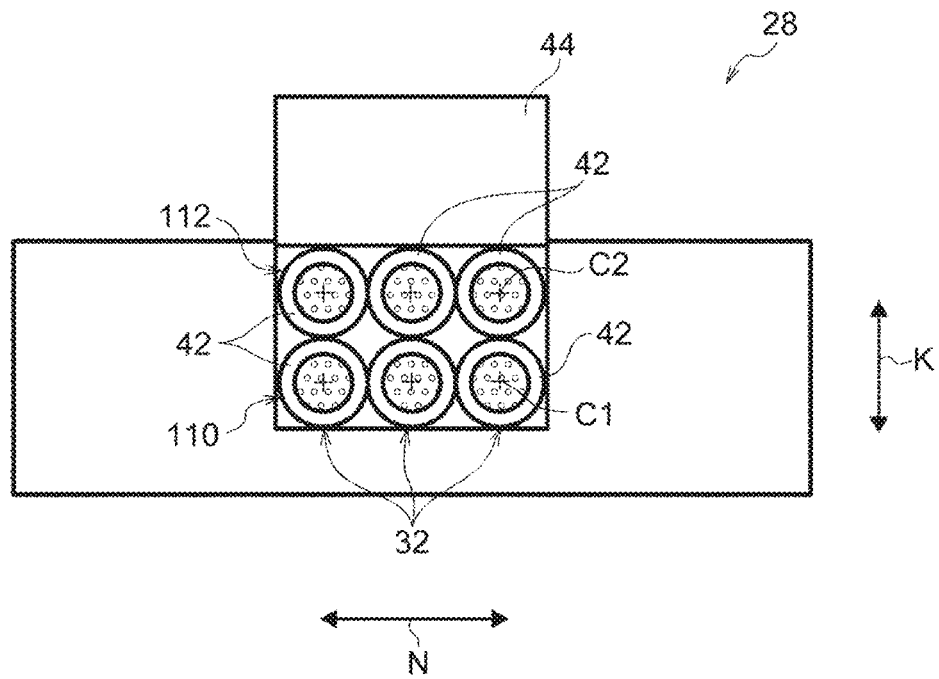
FIG. 14 is a front view illustrating a delivery unit of a manufacturing apparatus according to a Third exemplary embodiment as viewed from a downstream position in a moving direction of manufacturing materials.

FIG. 14 is a front view of the delivery unit 28 of the manufacturing apparatus 10 according to the third exemplary embodiment.

Six individual heating units 32 are provided in the delivery unit 28. The individual heating units 32 form rows in the rectangular recess portion 41. In each row, the individual heating units 32 are arranged side by side along a bottom surface.

The rows includes a first row 110 disposed on the bottom surface of the rectangular recess portion 41, and a second row 112 disposed on the first row 110. The first row 110 overlaps the second row 112 are stacked in a stack direction K that intersects an arrangement direction N in which the individual heating units 32 are arranged.

Such a configuration can also have the same effects as the first exemplary embodiment.

The present exemplary embodiment can improve manufacturing efficiency as compared with a case in which the individual heating units 32 form a single row.

Fourth Exemplary Embodiment

Figure 15:
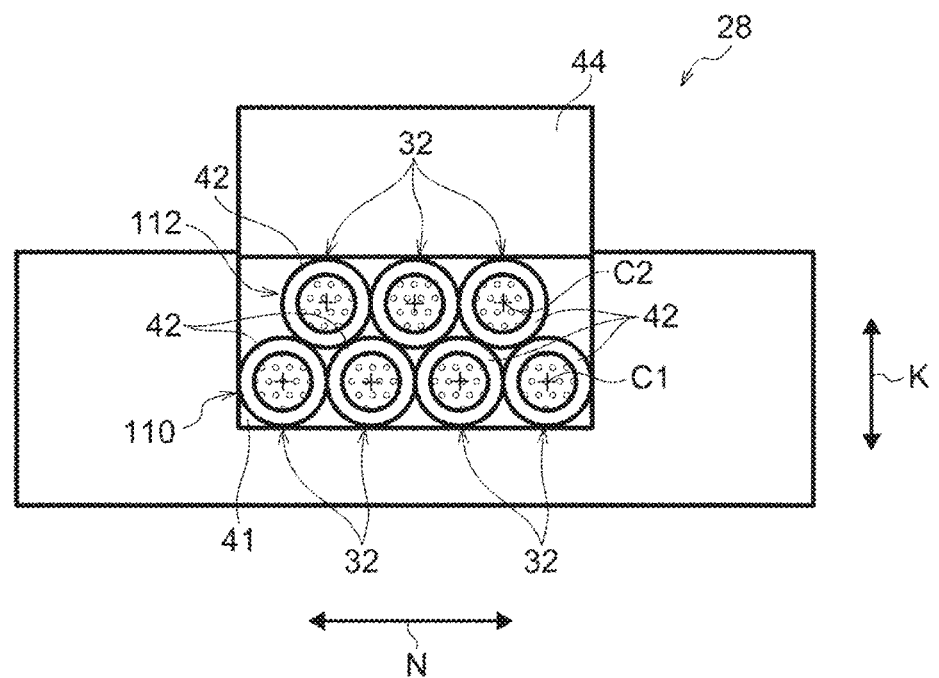
FIG. 15 is a front view illustrating a delivery unit of a manufacturing apparatus according to a fourth exemplary embodiment as viewed from a downstream position in a moving direction of manufacturing materials.

FIG. 15 is a front view of the delivery unit 28 in the manufacturing apparatus 10 according to the fourth exemplary embodiment.

Seven individual heating units 32 are provided in the delivery unit 28. The individual heating units 32 form rows in the rectangular recess portion 41. In each row, the individual heating units 32 are arranged side by side along the bottom surface.

The rows includes a first row 110 disposed on the bottom surface of the rectangular recess portion 41, and a second row 112 disposed on the first row 110. The first row 110 overlaps the second row 112 are stacked in a stack direction K that intersects an arrangement direction N in which the individual heating units 32 are arranged.

The individual heating units 32 of the first row 110 and the individual heating units 32 of the second row 112 are shifted such that center lines C1 of the individual heating units 32 of the first row 110 and the second row 112 and center lines C2 of the individual heating units 32 of the second row 112 are not aligned with each other in the stack direction K.

Such a configuration can also have the same effects as the third exemplary embodiment.

An arrangement density of the manufacturing materials 22 can be increased in the present exemplary embodiment as compared with a case in which the individual heating units 32 of the first row 110 and the individual heating units 32 of the second row 112 are stacked so as to be aligned with each other.

Fifth Exemplary Embodiment

Figure 16:
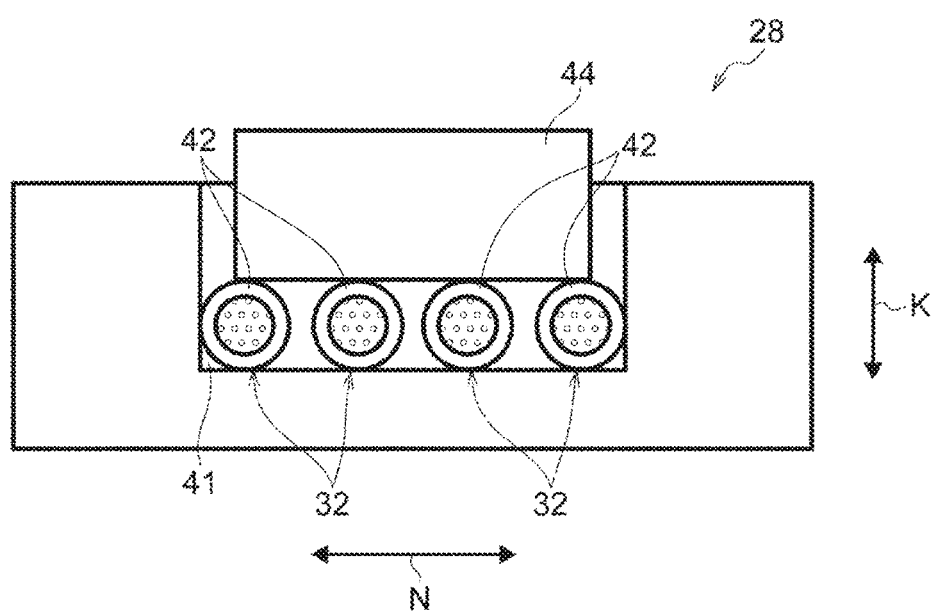
FIG. 16 is a front view illustrating a delivery unit of a manufacturing apparatus according to a fifth exemplary embodiment as viewed from a downstream position in a moving direction of manufacturing materials.
Figure 17:
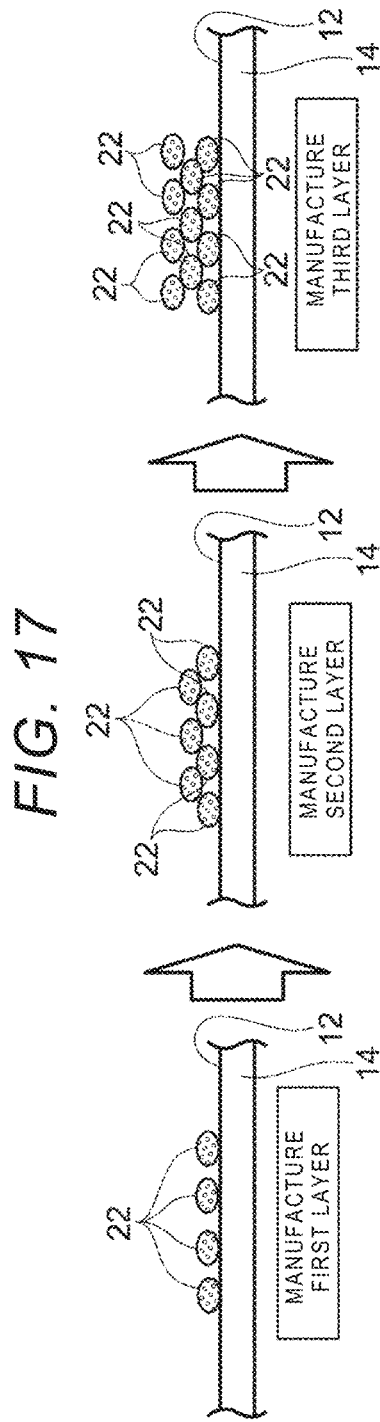
FIG. 17 is a diagram illustrating a procedure of applying manufacturing materials in the manufacturing apparatus according to the fifth exemplary embodiment.

FIGS. 16 and 17 are front views of the delivery unit 28 of the manufacturing apparatus 10 according to the fifth exemplary embodiment.

Four individual heating units 32 are provided in the delivery unit 28. The individual heating units 32 are arranged side by side on the bottom surface in the rectangular recess portion 41, and are separated from each other in the arrangement direction N.

FIG. 17 is a diagram illustrating a procedure of applying the manufacturing materials 22 in the manufacturing apparatus 10. First, the manufacturing materials 22 are applied onto the manufacturing surface 12 of the table 14, so as to form a first layer. Next, the manufacturing materials 22 are applied so as to be arranged between the manufacturing materials 22 of the first layer (that is, at positions shifted by a half pitch in the width direction), so that a second layer is formed. Then, the manufacturing materials 22 are applied so as to be arranged between the manufacturing materials 22 of the second layer (that is, at positions shifted by a half pitch in the width direction), so that a third layer is formed.

In the present exemplary embodiment, the manufacturing materials 22 of a lower layer are shifted in the width direction by the half pitch from the manufacturing materials 22 of an upper layer. It is noted that the present disclosure is not limited to this example. For example, the manufacturing materials 22 of a lower layer may be shifted by ¼ pitch in the width direction from the manufacturing materials 22 of an upper layer.

In this manner, since the manufacturing materials 22 of an upper layer are stacked to be arranged between the manufacturing materials 22 of a lower layer, a density of the manufacturing materials 22 can be increased.

Such a configuration can also have the same effects as the first exemplary embodiment.

In the present exemplary embodiment, a gap is formed between adjacent manufacturing materials 22 in each layer, and the manufacturing materials 22 of an upper layer can be filled in the gap.

Accordingly, an arrangement density of the manufacturing materials 22 can be further improved.

The pressing unit 52 has a cylindrical shape in the exemplary embodiments. It is noted that the pressing unit 52 is not limited to the cylindrical shape, but may have a plate shape.

The heating units 70 and 72 may be omitted.

Sixth Exemplary Embodiment

Figure 18:
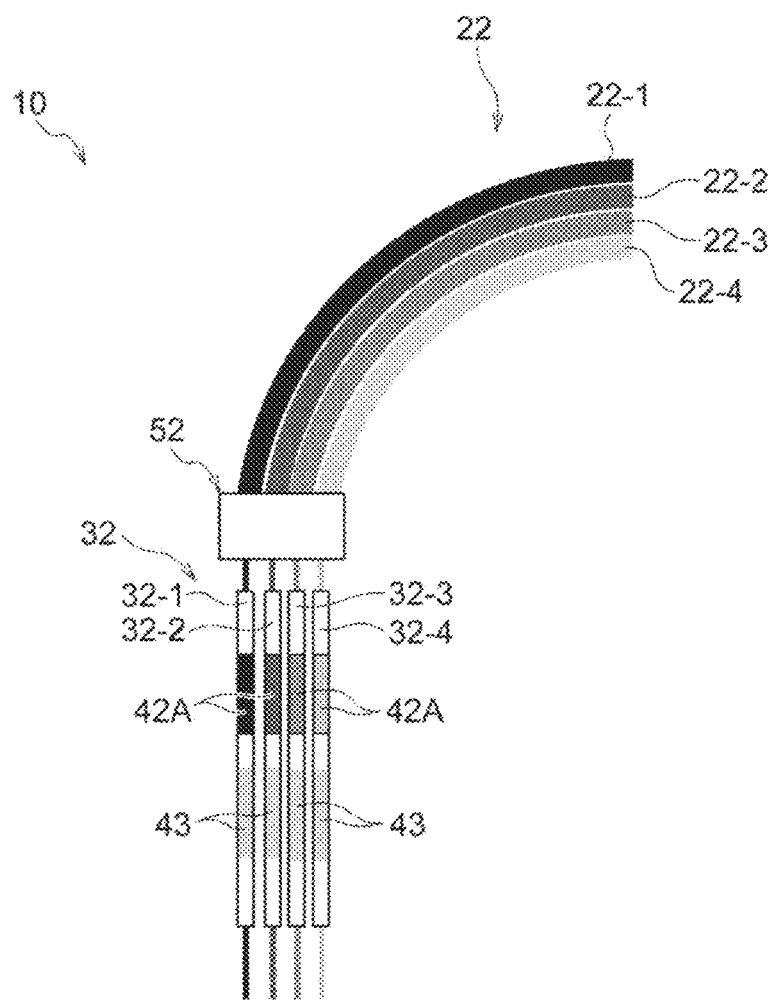
FIG. 18 is a diagram illustrating a sixth exemplary embodiment.

FIG. 18 is a diagram illustrating the manufacturing apparatus 10 according to the sixth exemplary embodiment. Description will be given only on differences from the first exemplary embodiment.

That is, when the manufacturing apparatus 10 changes an applying direction of the manufacturing materials 22 heated by individual heating units 32, a heating temperature of an individual heating unit 32-1 that heats a manufacturing material 22-1 provided at an outer side is higher than a heating temperature of an individual heating unit 32-4 that heats a manufacturing material 22-4 provided at an inner side.

In other words, setting temperatures of the individual heating units 32 decrease in order from the outermost individual heating unit 32-1 to the innermost individual heating unit 32-4.

Specifically, the outermost individual heating unit 32-1 heats the manufacturing material at 22-1 at 275° C. An individual heating unit 32-2 at the inner side of the individual heating unit 32-1 heats a manufacturing material 22-2 at 270° C. An individual heating unit 32-3 at the inner side of the individual heating unit 32-2 heats a manufacturing material 22-3 at 265° C. The individual heating unit 32-4 provided at the inner side of the individual heating unit 32-3 heats the manufacturing material 22-4 at 260° C.

The heating temperatures are not limited to the above values because the heating temperatures vary depending on the melting temperature of the resin 22B of the manufacturing materials 22.

The manufacturing material provided at the outer side is prompted to be elongated in the present exemplary embodiment as compared with a case in which heating temperatures at which the manufacturing materials 22 are heated are the same.

Seventh Exemplary Embodiment

Figure 19:
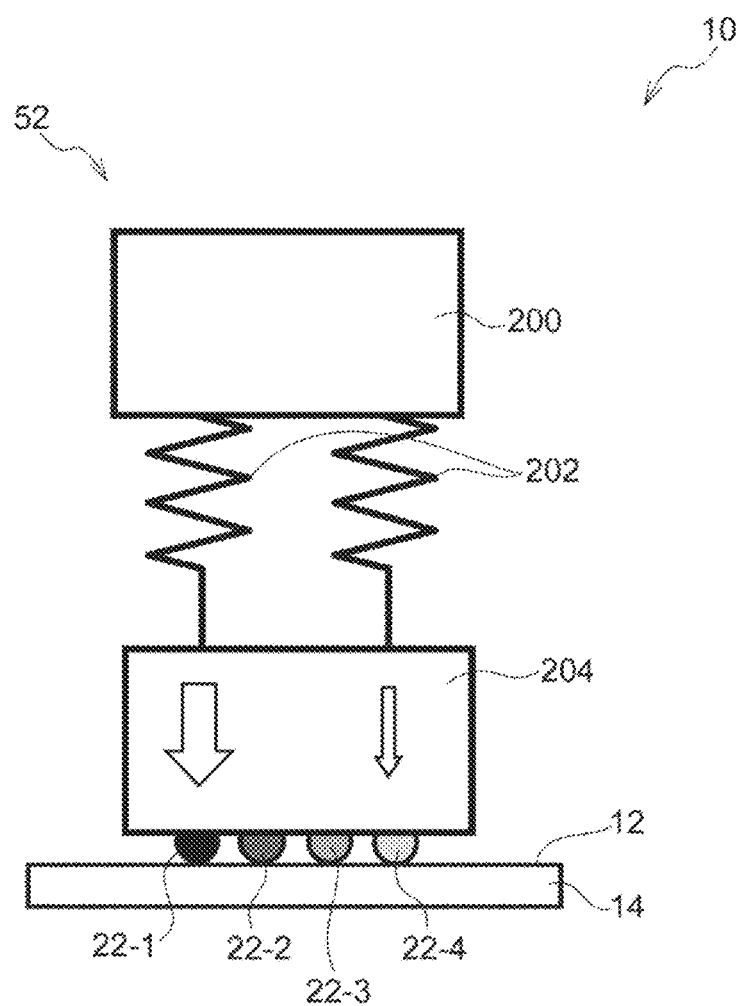
FIG. 19 is a diagram illustrating a seventh exemplary embodiment.

FIG. 19 is a diagram illustrating the manufacturing apparatus 10 according to the seventh exemplary embodiment. Description will be given only on differences from the first exemplary embodiment.

That is, the pressing unit 52 of the manufacturing apparatus 10 includes an inclinable base block 200, and an inclinable pressing block 204 that is supported by the base block 200 via coil springs 202. The pressing block 204 presses the manufacturing materials 22 towards the table 14. A pressing device (not illustrated) applies, to the base block 200, a force directed to the pressing block 204. The pressing device can change the force applied to the base block 200 in a width direction of the base block 200.

In the manufacturing apparatus 10 according to the present exemplary embodiment, the pressing unit 52 changes a force applied to the pressing block 204 in the width direction when an applying direction of the manufacturing materials 22 heated by the individual heating units 32 is changed. Accordingly, a pressing force applied to the manufacturing material 2 provided at the outer side is made larger than a pressing force applied to the manufacturing material 22-4 provided at the inner side, by a spring load of the coil springs 202.

A method for changing the pressing forces applied to the manufacturing materials 22 is not limited to this example.

The present exemplary embodiment can widen the manufacturing material 22-1 provided at the outer side as compared with a case in which pressing forces applied to the manufacturing materials 22 are the same.

Eighth Exemplary Embodiment

Figure 20:
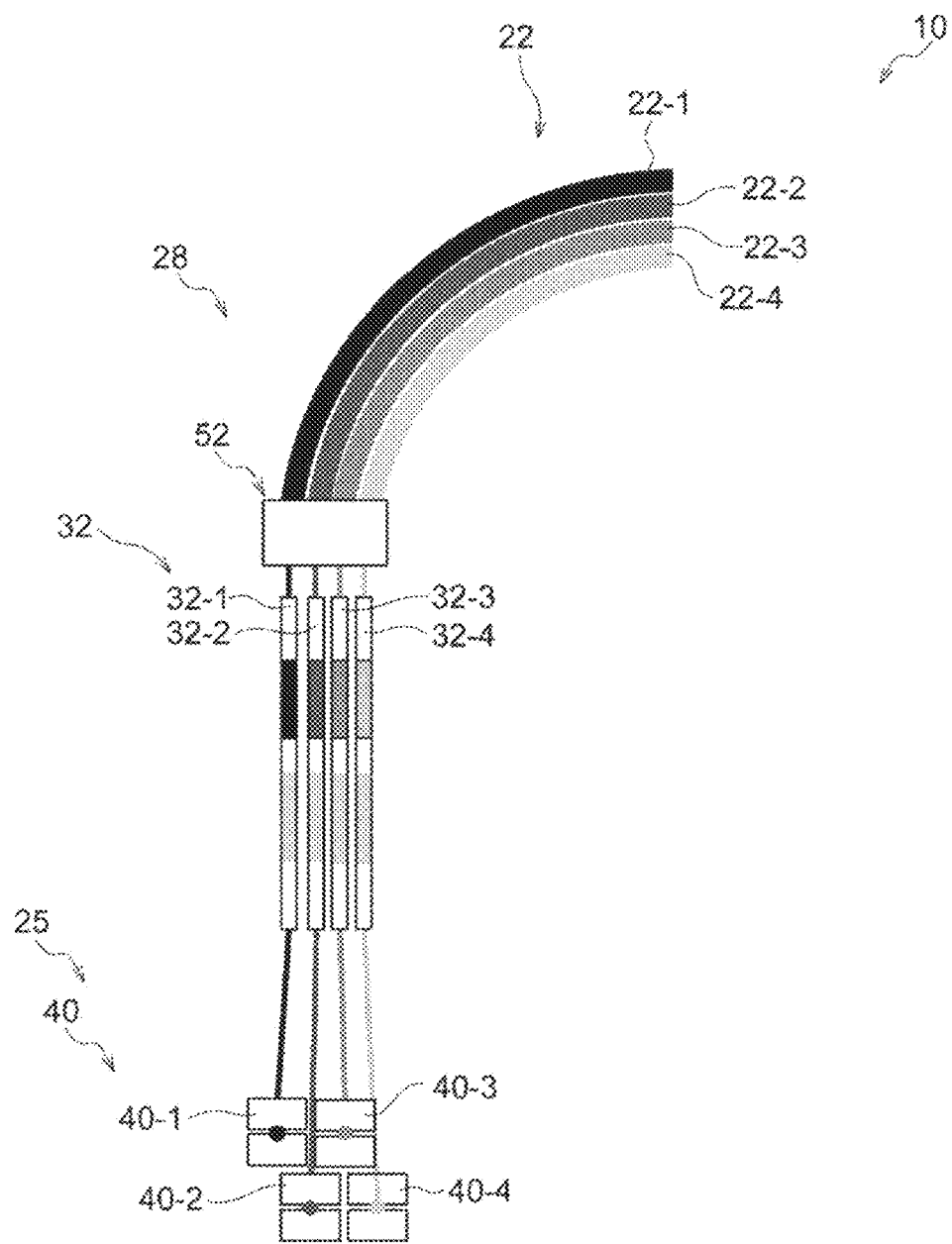
FIG. 20 is a diagram illustrating an eighth exemplary embodiment.

FIG. 20 is a diagram illustrating the manufacturing apparatus 10 according to the eighth exemplary embodiment. Description will be given only on differences from the first exemplary embodiment.

That is, when an applying direction of the manufacturing materials 22 heated by the individual heating units 32 is changed, the delivery unit 28 increases a delivery amount of the manufacturing material 22-1 provided at the outer side to be larger than a delivery amount of the manufacturing material 22-4 provided at the inner side.

Specifically, the downstream transport units 25 that transport the manufacturing materials 22 to the delivery unit 28 are respectively provided for the manufacturing materials 22. The downstream transport units 25 control rotational speeds of the downstream rollers 40 (including 40-1, 40-2, 40-3, and 40-4), respectively. Accordingly, the delivery unit 28 can control a delivery amount of each manufacturing material 22.

In other words, a transport speed of the manufacturing material 22-1 at the outermost side is the largest, and a transport speed decreases in order of the manufacturing material 22-2 at the inner side of the manufacturing material 22-1, the manufacturing material 22-3 at the inner side of the manufacturing material 22-2, and the manufacturing material 22-4 at the inner side of the manufacturing material 22-3.

The transport speeds of the manufacturing materials 22 can be controlled in accordance with a curvature of a manufacturing curve.

An elongation percentage of the manufacturing material 22-1 provided at the outer side can be decreased in the present exemplary embodiment as compared with a case in which delivery amounts of the manufacturing materials 22 are the same.

Experimental Results

FIG. 21 is a diagram illustrating experimental results. 21 illustrates manufacturing properties of the three-dimensional object when a pressing force from the pressing unit 52 is changed in the manufacturing apparatus 10 according to the present exemplary embodiment. The manufacturing properties becomes better in order of "×", "Δ", and "O".

It is found that bending strength and inter-layer adhesion properties of the manufacturing materials 22 are poor when the pressing force from the pressing unit 52 is too small during manufacturing.

Based on the results, the pressing force of the pressing unit 52 pressing the manufacturing materials 22 towards the table 14 is preferably 1.5 kgf/cm$^2$ in each exemplary embodiment described above.

Accordingly, adhesion between manufacturing materials can be improved as compared with a case in which the pressing force is less than 1.5 kgf/cm$^2$, in addition, the bending strength can be improved.

Manufacturing Condition for Each Resin Type

FIG. 22 is a diagram illustrating a manufacturing condition for each resin material type. FIG. 22 illustrates a melting temperature and a manufacturing temperature for each type of the resin 22B of the manufacturing material 22. PP represents polypropylene resin, PA6 represents polyamide 6, PA66 represents polyamide 66, PA12 represents polyamide 12, ABS represents acrylonitrile butadiene styrene, and PEEK represents polyether ether ketone resin.

That is, melting temperatures differ depending on the resin 22B of the manufacturing materials 22 when the manufacturing materials 22 are heated by the individual heating units 32. Therefore, manufacturing temperatures during manufacturing are to be set separately.

In the exemplary embodiments described above, heating temperatures at which the manufacturing materials 22 are heated by the individual heating units 32 are set to the manufacturing temperatures illustrated in FIG. 22 in accordance with resin material that is used as the resin 22B of the used manufacturing materials 22.

Accordingly, the heating temperatures at which the manufacturing materials 22 are heated by the individual heating units 32 are equal to or higher than the melting temperatures of the manufacturing materials 22.

The heating temperature at which the manufacturing materials 22 are heated by pressing unit 52 is controlled in accordance with a type (resin material) of the resin 22B of the manufacturing materials 22. Specifically, the heating temperature at which the manufacturing materials 22 are heated by the pressing unit 52 is set to the manufacturing temperature as illustrated in FIG. 22 in accordance with the resin material of the resin 22B of the used manufacturing materials 22.

The heating temperature during manufacturing is equal to or higher than the melting temperature of the resin 22B, but is not limited thereto because a manufacturing speed, a shape of the three-dimensional object, and the like are changed and controlled each time.

Accordingly, adhesion between the manufacturing materials 22 can be improved as compared with a case in which the heating temperature is lower than the melting temperature of the manufacturing material.

Adhesion between the manufacturing materials 22 can be improved as compared with a case in which the heating temperature of the pressing unit 52 is constant regardless of the type of the resin of the manufacturing materials 22.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A manufacturing apparatus comprising:
a delivery unit that delivers a plurality of linear manufacturing materials that are arranged side by side to apply the manufacturing materials onto a table, the delivery unit comprising a rectangular recess, and the manufacturing materials containing resin; a plurality of individual heaters that individually heat the manufacturing materials delivered by the delivery unit; and a block that is inserted into the rectangular recess and in contact with the individual heaters; wherein the plurality of individual heaters form rows, the individual heaters of each row are arranged side by side in an arrangement direction, and the rows are stacked in a direction intersecting the arrangement direction; and wherein the rows comprise a first row and a second row stacked on the first row, and the individual heaters of the first row and the individual heaters of the second row are shifted such that center lines of the individual heaters of the first row and center lines of the individual heaters of the second row are not aligned with each other in a stack direction in which the rows are stacked.

2. The manufacturing apparatus according to claim 1, wherein heating temperatures are set for the individual heaters individually.

3. The manufacturing apparatus according to claim 2, wherein
when an applying direction of the manufacturing materials heated by the individual heaters is changed, a heating temperature of an individual heater that heats a manufacturing material provided at an outer side is higher than a heating temperature of an individual heater that heats a manufacturing material provided at an inner side.

4. The manufacturing apparatus according to claim 1, wherein
when an applying direction of the manufacturing materials heated by the individual heaters is changed, the delivery unit increases a delivery amount of a manufacturing material provided at an outer side to be larger than a delivery amount of a manufacturing material provided at an inner side.

5. The manufacturing apparatus according to claim 4, wherein
heating temperatures are set for the individual heaters individually, and
when the applying direction is changed, a heating temperature of an individual heater that heats the manufacturing material provided at the outer side is higher than a heating temperature of an individual heater that heats the manufacturing material provided at the inner side.

6. The manufacturing apparatus according to claim 1, wherein the individual heaters change heating temperatures according to delivery amounts of the manufacturing materials delivered by the delivery unit.

7. The manufacturing apparatus according to claim 1, wherein heating temperatures at which the manufacturing materials are heated by the individual heaters are equal to or higher than melting temperatures of the manufacturing materials.

8. The manufacturing apparatus according to claim 1, wherein each of the individual heaters has a tubular shape through which the corresponding manufacturing material passes.

9. The manufacturing apparatus according to claim 1, further comprising:
a pressing unit that presses, towards the table, the manufacturing materials supplied from the individual heaters to the table, wherein the pressing unit has a columnar shape.

10. The manufacturing apparatus according to claim 9, wherein a pressing force of the pressing unit pressing the manufacturing materials towards the table is 1.5 kgf/cm² or more.

11. The manufacturing apparatus according to claim 9, further comprising:
a downstream heater provided downstream of the pressing unit in a moving direction of the manufacturing materials, the downstream heater heating the pressing unit.

12. The manufacturing apparatus according to claim 11, wherein heating temperatures at which the manufacturing materials are heated by the pressing unit are controlled in accordance with a type of the resin of the manufacturing materials.

13. The manufacturing apparatus according to claim 9, further comprising:
an upstream heater provided upstream of the pressing unit in a moving direction of the manufacturing materials, the upstream heater heating the plurality of manufacturing materials simultaneously.

14. The manufacturing apparatus according to claim 9, wherein when an applying direction of the manufacturing materials heated by the individual heaters is changed, the pressing unit increases a pressing force to a manufacturing material provided at an outer side to be larger than a pressing force to a manufacturing material provided at an inner side.

15. The manufacturing apparatus according to claim 1, further comprising:
a cutter provided upstream of the delivery unit in a moving direction of the manufacturing materials, the cutter cutting the manufacturing materials to a length required in manufacturing.

* * * * *